Figure 1:
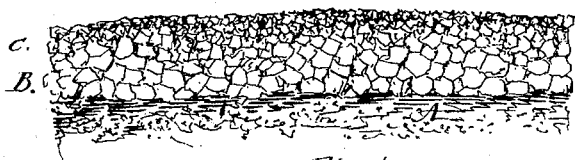
Figure 2:
Figure 3:

A. HOYT.
PAVEMENT FOR STREETS AND WALKS.

No. 78,455. Patented June 2, 1868.

78,455

UNITED STATES PATENT OFFICE.

ASA HOYT, OF CHICAGO, ILLINOIS.

IMPROVEMENT IN PAVEMENTS FOR STREETS AND WALKS.

Specification forming part of Letters Patent No. 78,455, dated June 2, 1868.

*To all whom it may concern:*

Be it known that I, ASA HOYT, of Chicago, Cook county, Illinois, have invented new and useful Improvements in the Composition and Methods of Preparing and Laying Concrete Pavement for roadways, park and carriage-drives, garden and house-walks, stable and shop-floors, cellar-bottoms, &c.; and I do hereby declare the following to be a full and exact description of the same, reference being had to the drawings that accompany and form a part of this specification, in which the manner of distributing the coarser and finer material is illustrated.

A represents the bed or prepared roadway; B, first or layer of coarse pebbles or broken stone, prepared as hereinafter set forth; C, the upper layer of finer pebbles and coarse sand.

The nature of my invention consists in the use of such materials and such an admixture of them, and their combination and union under such circumstances, as to produce a pavement at once ready for use, of great durability, and one that will not be affected by change of temperature, such as the heat of warm or the frosts of cold climates.

The materials I use are crushed stone, or stone chips or pebbles, or large gravel-stones, small gravel-stones, coarse gravel, sand, coal or pine tar, or both, gas-house or spent lime, and hydraulic cement.

The modes of preparing are as follows: I take crushed or broken stone or screened pebbles and mix with these as much coal-tar or coal and pine tar as can be well taken up at ordinary temperature, say blood-heat. This mixture I lay away in bulk. I then take finer pebbles and gravel-stones, and having incorporated them with tar, as above, put it aside by itself. These preparations may be kept in waiting a month or more when convenience may require.

To put down any of my pavement, having prepared the bed or road on which it is to rest with gravel-waste, broken stone, cinders, dry loam, or such material as may be best secured, I take of sharp or common sand one part, of hydraulic cement one part, of gas-house lime two parts; incorporate these thoroughly in the dry state. I then mix as much of this compound with a portion of the coarse stones and tar above mentioned as can be well raked in—ordinarily from one-sixth to one-fourth as much of this compound as of the tarred stone. Immediately on uniting these two compounds I spread the product evenly upon the prepared bed as the first layer, in thickness from two to six inches for carriage-roads and less for walks and floors, as may seem advisable. On this a heavy roller is used, giving it all desirable compression. Next, I take a portion of the finer tarred stone and gravel and rake in as much of the compounded sand, cement, and gas-house lime as I can well incorporate to the extent and in manner as mentioned of the first or coarser preparation. Then spread this evenly over the first layer, rolling it down well with a heavy roller, sprinkling it the while with alum-water, completing the whole by sprinkling or sanding in sand or stone-dust.

I have mentioned the pavement as being completed in two layers, but I do not confine myself to any exact number.

I use the gas-house lime to produce both hardness and toughness.

In most of the compositions for pavements of this nature coal or wood ashes, one or both, have been used, the effect of which is evidently only to take up and harden the tar; consequently the pavement is defective in tenacity and shells up by the continued concussion of passing wheels. Another advantage is in my method of mixing and laying. As I mix in the gas-house lime and cement in a dry state, and just at the time the layers are put down they do not become mortar-like nor plastic until passing under the process of rolling; hence the result is a perfectly solidified mass, and, if made into blocks, would bear any amount of blows or pressure. Still further, as the gas-house lime and cement set or harden at once, this pavement is ready for use without the inconvenient delay required by most similar compositions.

In speaking of the preparation of the bed on which my pavement or composition is to be laid I have given the idea of the structure with reference to new ungraveled or unpaved roads.

My composition is especially adapted to be spread on graveled walks or roads, or upon a stone or other pavement; indeed, I consider a cobble-stone pavement one of the best foundations for it. In using this composition on old pavements or macadamized roads the larger pebbles or crushed stone will not be required.

What I claim as of my invention, and desire to secure by Letters Patent, is—

1. The use of gas-house lime in compounding street-pavements, when mixed and applied substantially as specified, and for the purposes set forth.

2. A pavement compounded as specified—that is, of small stone and gravel, coal or pine tar, sand, cement, and gas-house lime.

3. The use of alum-water at the time of laying, as specified.

In testimony whereof I have signed my name to this specification in the presence of two subscribing witnesses.

ASA HOYT.

Witnesses:
D. C. COLBY,
J. F. COLBY.